Nov. 19, 1968    R. A. MASON    3,411,628
COMBINATION PLASTIC-STAINLESS STEEL SINK STRAINER
Filed Feb. 21, 1966    2 Sheets-Sheet 1

RICHARD A. MASON
INVENTOR.

BY

Nov. 19, 1968    R. A. MASON    3,411,628
COMBINATION PLASTIC-STAINLESS STEEL SINK STRAINER
Filed Feb. 21, 1966    2 Sheets-Sheet 2
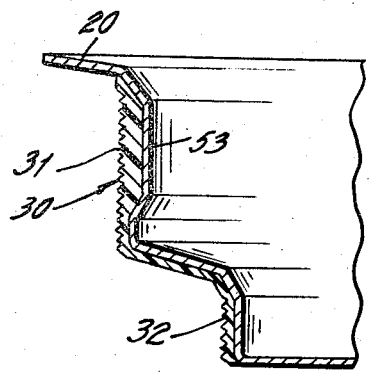
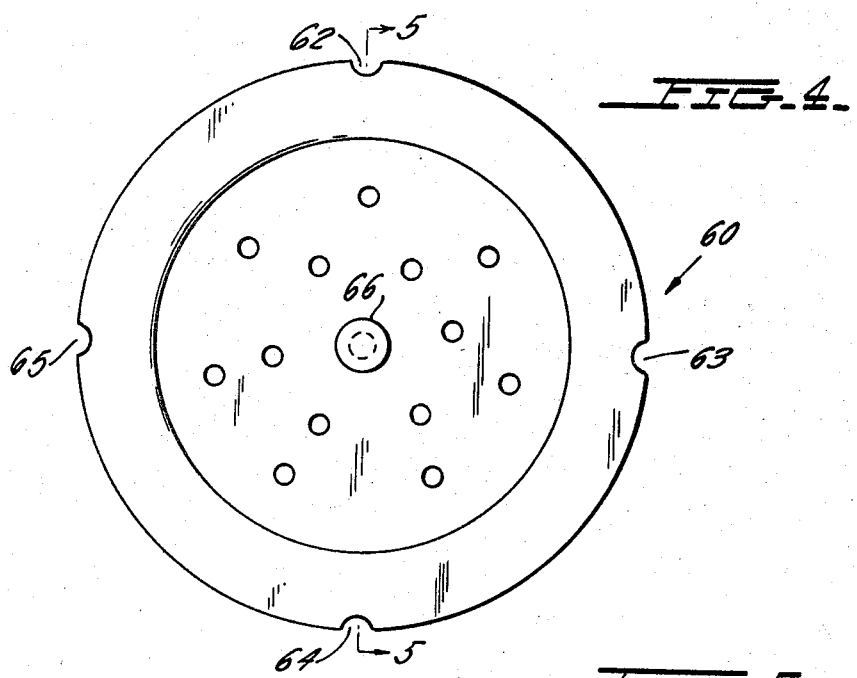
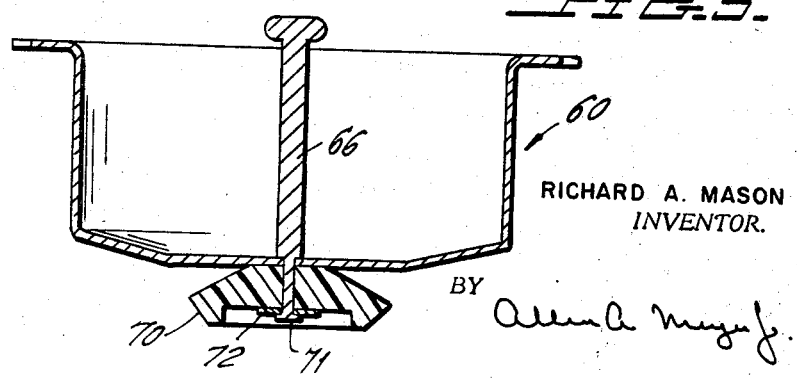
RICHARD A. MASON
INVENTOR.
BY United States Patent Office

3,411,628
Patented Nov. 19, 1968

3,411,628
COMBINATION PLASTIC-STAINLESS STEEL
SINK STRAINER
Richard A. Mason, Orange, Conn., assignor to National Distillers and Chemical Corporation, New York, N.Y., a corporation of Virginia
Filed Feb. 21, 1966, Ser. No. 528,897
3 Claims. (Cl. 210—163)

ABSTRACT OF THE DISCLOSURE

A composite sink strainer comprising a thin stainless steel inner body including axially aligned upper and lower tubular portions, the upper portion being of greater diameter than the lower portion and having a plurality of inwardly extending spaced protrusions formed therein, the outer surface of each protrusion providing a complementary depression, and an annular plastic body of greater thickness molded upon said inner body in intimate surrounding relationship, the upper and reduced lower peripheral surfaces of said plastic body having screw threads molded therein. The material of the molded plastic body fills the depressions in the outer surfaces of the protrusions in the steel inner body and provides a unitary and inseparable association between the stainless steel inner body and the surrounding plastic body.

---

This invention relates to a novel sink strainer structure, and more particularly relates to a novel sink strainer formed of a thin stainless steel body having an external annular plastic coating or body which receives threads required for connection of the strainer to a sink wherein the reverse surface of the basket guiding protrusions of the strainer further serves as means for locking the plastic body to the stainless steel body.

The strainer structure commonly used for sinks and bathtubs, and the like, is normally made of a relatively thick walled metallic body which is sufficiently thick to receive external threads needed for connection of the strainer to the sink and for the connection of a drain pipe to the strainer.

Many attempts have been made to reduce this required thickness as by using a relatively thin walled material in which the thread shapes are pre-formed in the body so that a machined thread is not necessary. Another attempt to reduce the required wall thickness has been to use a plastic coating on the exterior surface of the strainer and to form the threads in this plastic surface. This approach is shown, for example, in Swiss Patent 275,354, dated Aug. 1, 1951.

The principle of the present invention is to provide a novel sink strainer structure which is comprised of a thin stainless steel body surrounded by a plastic which receives threads in the manner described in the above noted patent where, however, inwardly formed basket guiding protrusions are provided in the stainless steel strainer body with the corresponding indentations on the outer surfaces of these protrusions serving to lock the plastic on the stainless steel body. This will then prevent relative movement between the stainless steel body and the exterior plastic, and avoids problems presented in causing high adhesion between the plastic surface and the stainless steel surface.

Accordingly, a primary object of this invention is to provide a novel sink strainer which is relatively inexpensive.

Another object of this invention is to provide a novel sink strainer which uses a relatively thin stainless steel body which has bonded thereto an exterior plastic annular body containing threads and which is rigidly secured to the stainless steel material.

Another object of this invention is to use the exterior depressions formed by basket guides in a stainless steel sink strainer as the means for locking an external annular plastic body to the stainless steel body.

These and other objects of this invention will become apparent from the following description when taken in connection with the drawings, in which:

FIGURE 3 is a cross-sectional view of FIGURE 1 taken across the line 3—3 in FIGURE 1 to illustrate the manner in which the protrusions serving as a basket guide in the stainless steel body further serve to mechanically lock the external plastic against rotational or axial movement with respect to the stainless steel body.

FIGURE 4 is a top view of a typical strainer basket which could be used with the sink strainer of FIGURES 1, 2 and 3.

FIGURE 5 is a cross-sectional view of FIGURE 4 taken across the line 5—5 in FIGURE 4.

Figure 1:
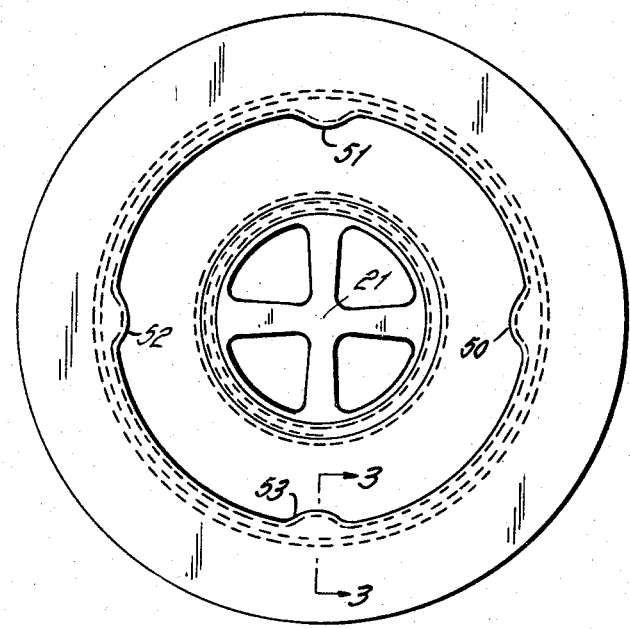
FIGURE 1 is a top view of the novel strainer of the present invention.
Figure 2:
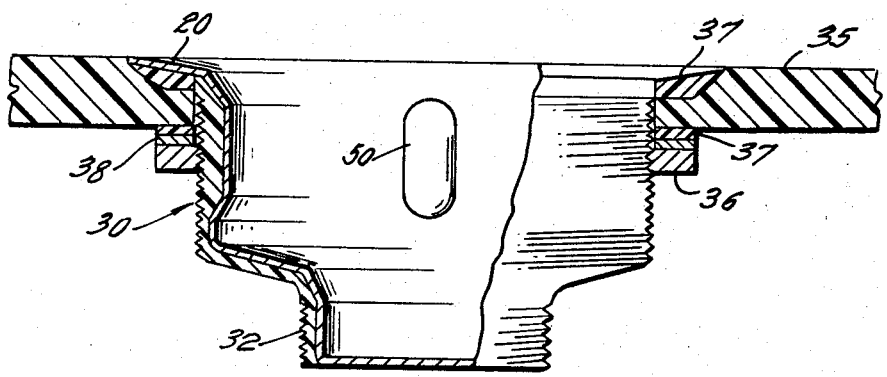
FIGURE 2 is a side view partially in cross-section of the strainer of FIGURE 1.

Referring now to the drawings, FIGURES 1, 2 and 3 illustrate the novel sink strainer of the invention as comprising a thin stainless steel interior 20 which could, for example, have a thickness of 0.025 inch formed to the usual strainer shape, as shown with the web 21 at the bottom of the strainer. The exterior side surface of the stainless steel strainer 20 then has molded thereon a plastic body 30 which receives two threaded regions 31 and 32. Note that since the needed threads 31 and 32 are formed in the plastic, it is unnecessary to form such threads in the thin walled stainless steel strainer 20, or to use a thick walled material which can receive such threads. The threaded regions 31 and 32 are needed for connection to the sink and to a suitable outlet drain.

Thus, as shown in FIGURE 2, the assemblage is secured to sink 35 by means of a lock nut 36 on thread 31 with a putty-like compound 37 forming a leak-proof seal between strainer 20 and the opening in sink 35. A suitable washer 38 is interposed between nut 36 and sink 35. The lower thread 32 then provides means for connection of the strainer to a suitable drain tube (not shown).

As previously indicated, the mere use of a plastic coating on a thin walled strainer where the plastic coating serves to receive threads is old and well known. It has, however, been found that with such arrangements, it is extremely difficult to bond the plastic coating to the stainless steel strainer with sufficient strength to prevent relative axial motion between the plastic coating and the strainer 20 or relative rotative motion between these members.

In accordance with the present invention, however, the stainless steel strainer 20 is made to be of the type generally shown in U.S. Patent 2,707,287 to Hiertz and includes protrusions 50, 51, 52 and 53 placed in the stainless steel strainer 20 to serve as a guide for the strainer basket. Note, however, that the protrusions 50 through 53 do not extend over the full depth of the strainer wall in which they are placed, as is the usual construction, but terminate intermediate the top and bottom edges of said strainer wall.

This is, and as shown particularly in FIGURES 2 and 3, the protrusions 50 through 53 extend only for a length centrally located within the wall section in which they are contained. Accordingly, when the plastic 30 is molded over the exterior of stainless steel strainer 20, it will be "locked" into the exterior surface of the protrusions in the stainless steel strainer 20. Note that the depressions behind the guide protrusions 50 through 53 are formed in the same operation in which these protrusions are formed in the thin walled strainer body 20.

The protrusions 50 through 53 then serve to guide a suitable strainer basket 60 of FIGURES 4 and 5 in the usual manner. Thus, in FIGURES 4 and 5 the strainer basket 60 has a plurality of openings therethrough in the usual manner and is rotatably located within the strainer 20 by means of notches 62, 63, 64 and 65 which slide over and cooperate with protrusions 50 through 53 of FIGURE 1 in the usual manner. A projecting handle 66 is connected to the basket 60 and a flexible valve 70 by peening over end 71 of handle 66 against a washer 72. The valve 70 will engage and close off the drum outlet (not shown) when the basket 60 is rotated so that notches 62 through 65 slide over and down protrusions 50 through 53 of FIGURE 1.

In the manufacture of the device, it has been found extremely useful to use acrylonitrile butadine styrene which is a copolymer which may be colored any desired color as the coating plastic. The use of this material has been found to involve sufficiently small shrinkage during curing to prevent distortion of the relatively thin walled stainless steel material 20 as well as cracking of the plastic material during shrinkage. Clearly, however, other suitable plastics could be used.

In the manufacture of the device, a basically two-step operation is used which leads to great economy. The first step is the formation of the inside stainless steel insert 20 by the normal cupping, piercing, stamping, trimming and polishing operation. The second step is the molding of the plastic body 30 over the stainless steel body. Good results have been obtained by placing the stainless steel inner body 20 over a mandrel to form the inside or male portion of a cavity mold which comes together with the female cavity section to form a plastic mold for the injection molding of the plastic.

The plastic is then injection molded in the usual manner through one or more sprues, and directly onto the stainless steel. Thus, the plastic fills all of the depressions behind the protrusions 50 through 53 to obtain the desired mechanical interlock as well as a shrink-fit as the plastic cools and shrinks over the stainless steel body 20.

The female section of the mold, of course, contains thread molds for the formation of threads 31 and 32. Depending upon the type plastic used, it is also possible to obtain some chemical bond of plastic to metal where the metal is suitably primed to improve this bond. In accordance with the present invention, however, such bonding is unnecessary since a direct mechanical interlock is obtained.

The resulting device, as emphasized above, has the major advantage of economy over the presently existing strainer structures. This economy is obtained by the replacement of metal with a less expensive plastic material, and by the molding of the threads directly rather than cutting the threads. Moreover, more reliable operation is obtained by virtue of the mechanical interlock between the stainless steel body and the plastic.

The resulting device then has the standard thread arrangement required for connection to all varieties of drain pipes, and the like, which has standard mating threads for the threads provided in the novel strainer.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A sink strainer comprising a central hollow thin metallic cup having a first wall diameter section for a portion of the length of said cup tapering down to a second wall section of lesser diameter extending to the opposite end thereof; said first and second wall diameter sections being joined along a shoulder defining a strainer basket seat; said first wall diameter section having a plurality of centrally-located, spaced and inwardly directed protrusions formed therein, the extent of each of said protrusions being less than the height of said first wall diameter section whereby said protrusions terminate intermediate the top and bottom edges of said first wall section; and a plastic body of greater thickness than said metallic cup molded upon the outer surface of said metallic cup in surrounding relationship thereto and in intimate contact therewith; the upper peripheral surface of said plastic body having a screw thread formed therein; said plastic body filling said protrusions to provide a unitary association with said metallic cup and prevent axial and rotational movement between said plastic body and said metallic cup.

2. The device substantially as set forth in claim 1 wherein said protrusions define strainer basket guide members.

3. The device as set forth in claim 1 wherein said plastic body extends over said second wall diameter section; said plastic body over said second wall diameter section having a second screw thread therein.

References Cited

UNITED STATES PATENTS

| 2,583,300 | 1/1952 | Marcussen | 210—163 X |
| 2,668,962 | 2/1954 | Spector | 4—287 |
| 2,707,287 | 5/1955 | Hiertz | 4—287 |
| 2,860,836 | 11/1958 | Jordan | 4—288 X |

FOREIGN PATENTS 275,354  5/1951  Switzerland.

REUBEN FRIEDMAN, *Primary Examiner.*

W. S. BRADBURY, *Assistant Examiner.*